2,814,955
Patented Dec. 3, 1957

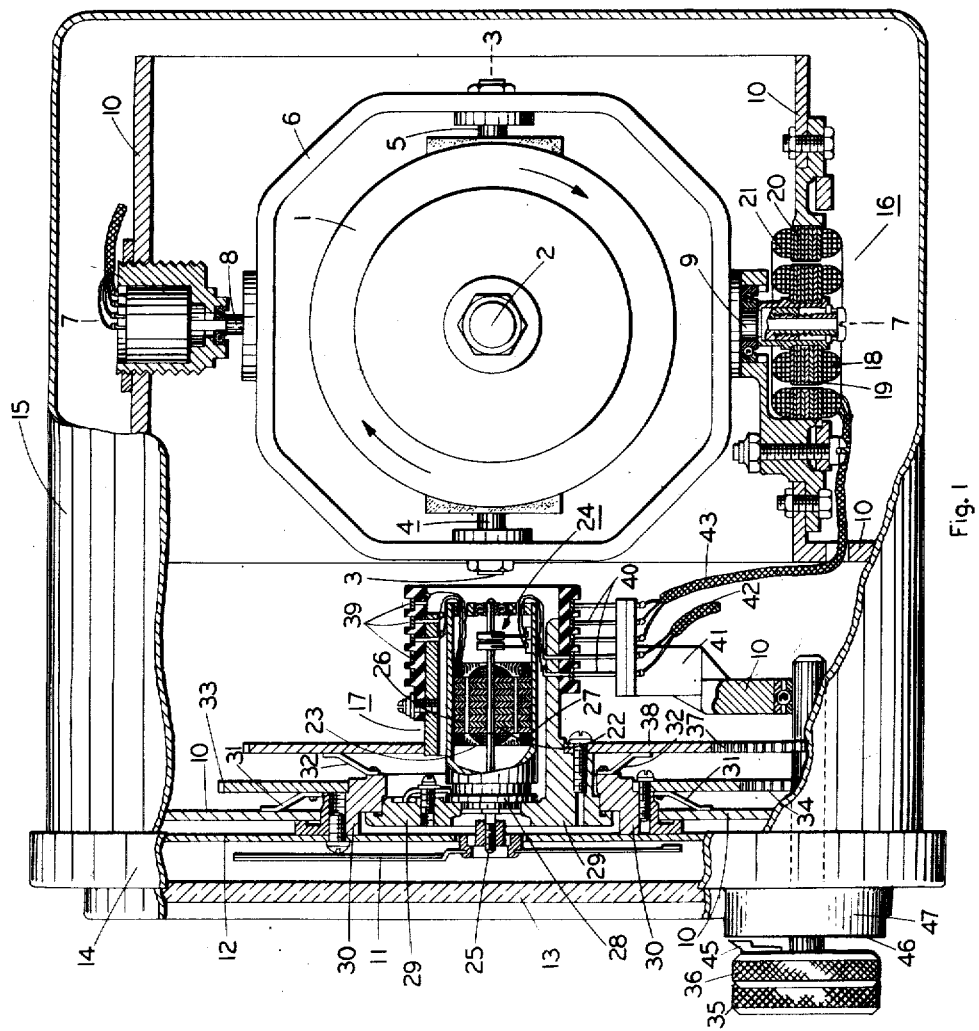

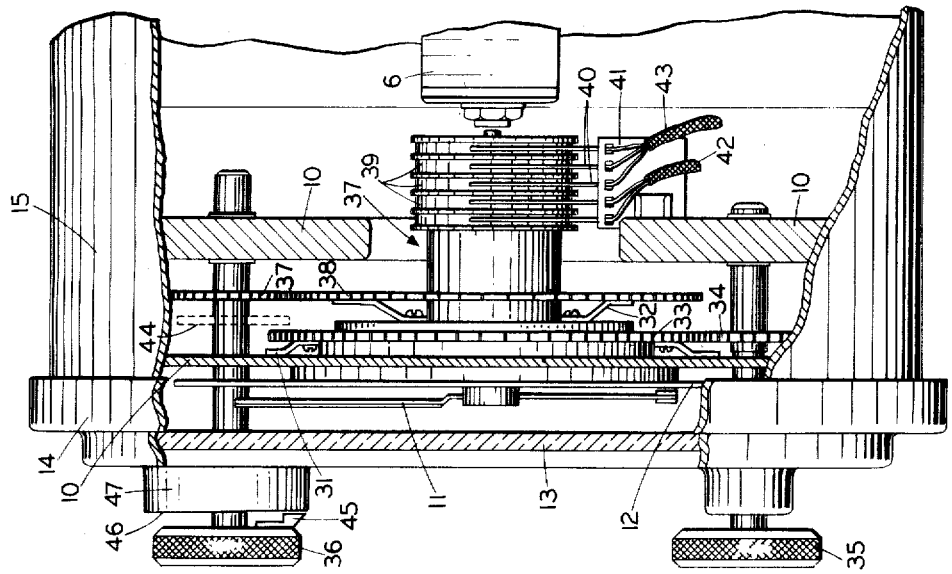

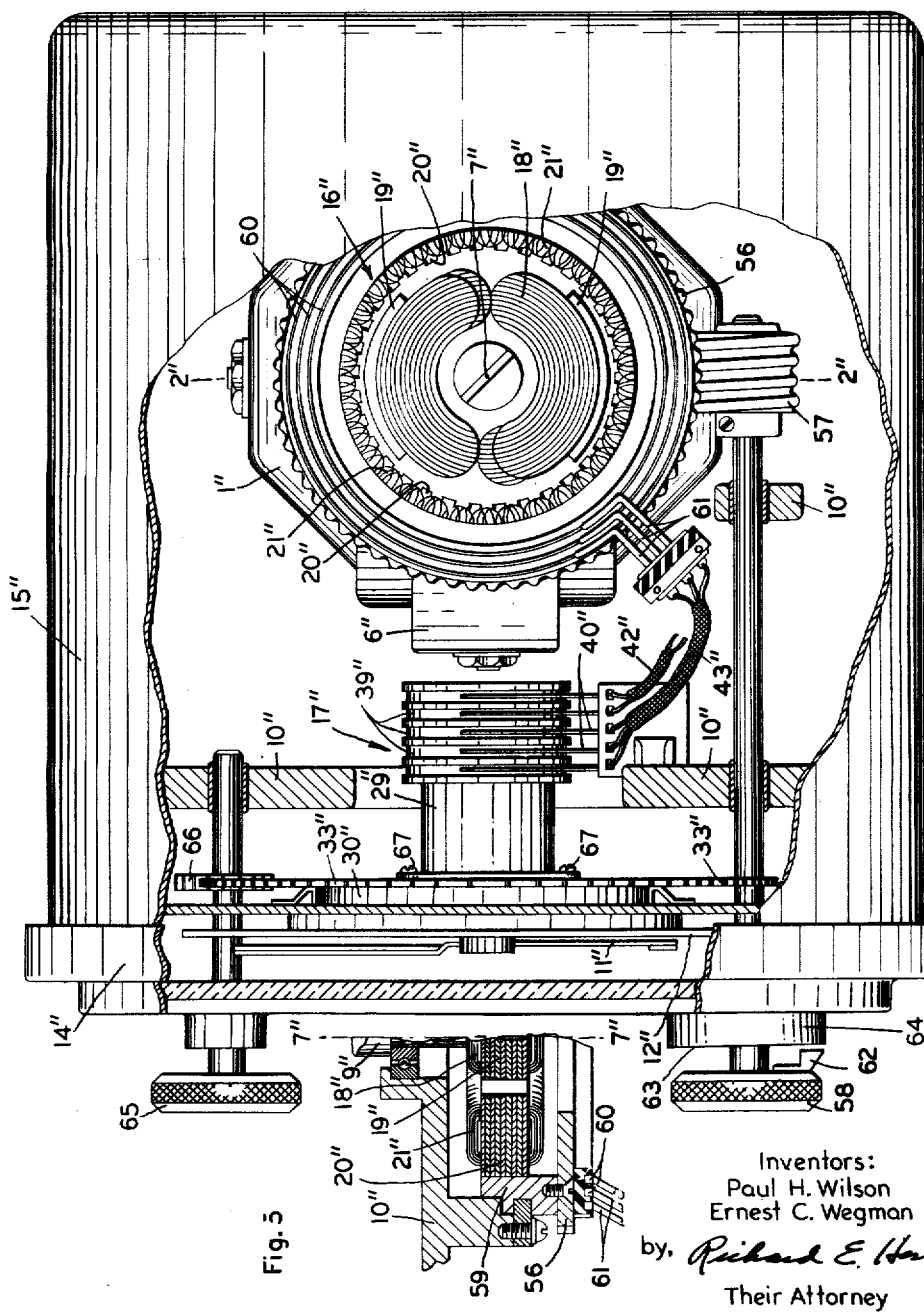

2,814,955

GYRO SETTING ARRANGEMENT

Ernest C. Wegman, Nahant, and Paul H. Wilson, Swampscott, Mass., assignors to General Electric Company, a corporation of New York Application December 22, 1955, Serial No. 554,835

12 Claims. (Cl. 74—5.6)

The present invention relates to gyroscopes and, more particularly, to improved adjustable indicating mechanisms for directional gyroscopes.

Universally-mounted gyroscopes for maintaining azimuth references aboard aircraft are each commonly provided with a gear attached to the main gimbal, which gimbal is held fixed in azimuth by the spatial rigidity of the gyro rotor structure, and a cup-shaped gear rotatably supported by the outer casing and meshing with the gimbal gear to be rotated thereby and, in turn, to rotate a dial or pointer whenever the supporting aircraft turns in azimuth relative to the spin axis of the gyro rotor. Each time the instrument is put into operation, the spin axis and pointer must be properly set in azimuth, and, frequently, resetting may be required to compensate for gyro drift effects. In those instruments which have both a dial and pointer for the visual presentation of azimuth information, provision is often made for the angular adjustment of both the dial and pointer so that a desired azimuth or course reading always occurs at some preferred position, such as vertical, which may be readily scanned by the observer to ascertain at a glance whether or not the craft is on course.

Precision gyroscopes react very sensitively to even the slightest torques about their support axes, such that their rotor structures are easily precessed to erroneous attitudes in space. Accordingly, it is essential that corrections and settings of the aforementioned types be made without reflection of torques upon the gyroscopes. Also, the adjustable indicating mechanisms of such instruments must be capable of translating the most minute mechanical movements into azimuth indications and course settings which are and will remain exact, this requirement dictating that these mechanisms be sensitive and accurate in operation yet rugged enough to withstand the environmental conditions of flight. It has been customary in the past to provide a caging mechanism which physically restrains movement of the directional gyro about the minor or horizontal axis of freedom and to urge the main gimbal and its permanently attached indicating apparatus to a desired angular heading through a manually-operated element while the gyro is caged. Relative angular movements of the indicators and gyro mechanisms have also been permitted by slip-friction connections therebetween. However, these setting and adjusting arrangements introduce pronounced disadvantages; such as, the severe loading of bearings while caging is accomplished, the imposition of highly undesirable precessing torques while caging is released, and the necessity for uncaging only while the supporting craft is not maneuvering away from a substantially fixed flight altitude. Modern directional gyro instruments are required to have extremely low drift characteristics enabling their use in prolonged flights over magnetic polar regions where compass slaving is impossible, and such gyros must be corrected periodically to prevent their small drift errors from accumulating to substantial values. These corrections obviously cannot be made satisfactorily with error-introducing adjusting mechanisms, and further, the usual caging and setting operation consumes a sufficient time for the craft to alter its heading while the gyro is caged and unable to respond to changing craft attitudes. This same defect—loss of azimuth reference—occurs in those gyroscopes wherein the indicating elements are wholly decoupled from the gyro structure during resetting operations.

Accordingly, the arrangements here disclosed avoid the foregoing disadvantages and yield further benefits by providing accurate indications of directional gyroscope azimuth orientations without reflecting sizable precessing torques upon the gyroscope. Adjustments of indicator mechanisms are performed without decoupling the azimuth indicators from the gyroscope, such that heading information cannot be lost, and the gyroscope remains uncaged and is not disturbed by indicator manipulations. In one embodiment, provision is made for control of an integral gyroscope unit by two manually-actuated knobs, one of which may be operated to set an azimuth dial or pointer alone, and the other of which may be operated to set the same dial or pointer simultaneously with a further reference dial or index. Electrical angular motion repeaters are employed to translate gyro orientations into azimuth presentations, and as appears more fully hereinafter, the gyro front-end or adjustable indicating mechanisms are distinguished in that unavoidable backlash or slip in gearing or clutching assemblies does not introduce heading errors.

One of the objects of the present invention is to provide a novel and improved directional gyroscope unit having adjustable direct-indicating mechanisms which do not disturb gyro operation or lose azimuth information during setting and adjusting processes.

Another object is to provide improved directional gyroscopes having independently adjustable indicators which avoid errors due to backlash or slip and obviate the need for decoupling from or caging of their associated gyroscopes.

By way of a summary account of one aspect of this invention, the azimuth detecting apparatus comprises a three-degree-of-freedom directional gyro assembly, including a rotor structure pivotally supported about minor and major suspension axes. In association with the detecting apparatus is an azimuth pointer and a dial carrying azimuth indicia, both of these being mounted for independent angular movement about a common axis. In place of the usual cup-gear fixed with the azimuth pointer and meshing gimbal gear fixed with the gyro major gimbal, there are provided a first electromagnetic synchro unit sensing relative angular orientations between the gyro major gimbal and the outer instrument frame or case and a second electromagnetic synchro unit angularly orienting the azimuth pointer in relation to its associated azimuth dial or index. The stators of the two synchro units are provided with polyphase electrical interconnections, although a brush and slip ring assembly which permits relative angular movement between the stator of the second synchro unit and the outer instrument frame. At the second synchro unit, the synchro rotor positions the azimuth pointer, and the synchro stator is coupled with the dial through a slip-friction connection. One manually-actuated knob is geared with the dial, such that angular movement thereof rotates the dial, second synchro stator, second synchro rotor, and azimuth pointer in unison. A second manually-actuated knob may be caused to rotate only the second synchro stator, whereby only the azimuth pointer is angularly adjusted, without disturbance of the gyroscope.

Although the features of this invention which are believed to be novel are set forth in the appended claims, the details of preferred embodiments and further objects and advantages may be most readily comprehended through reference to the following description taken in connection with the accompanying drawings, wherein:

Figure 1 is a pictorial side view of a directional gyroscope constructed in conformity with this invention, the outer casing and part of the inner structure being broken away to reveal detail of the gyro and indicator mechanisms;

Figure 2 is a view of the front-end portion of the instrument of Figure 1, taken from below;

Figure 3 is a like view of a front-end portion of a directional gyro instrument wherein a differential gearing unit is employed for setting purposes;

Figure 4 illustrates a directional gyro instrument, viewed from below, wherein one setting adjustment is made through a synchro unit directly associated with the gyroscope main gimbal; and Figure 5 provides a detailed cross-section of part of the instrument shown in Figure 4.

The arrangement for practicing this invention which is illustrated in Figure 1 includes a directional gyroscope assembly having a gyro rotor member 1 which is spun at high speed about a normally horizontal spin axis 2. The rotor structure, including electrical rotor motive means (not visible in the drawing), is pivotally supported about a horizontal minor axis 3—3 by journals 4 and 5 in main gimbal 6, and the vertical main gimbal 6 is pivotally supported about a vertical major axis 7—7 by journals 8 and 9 in the instrument frame 10. Although the rotor structure shown is that disclosed in the patent application of H. C. Wendt, Serial No. 325,577, filed December 12, 1952, for "Symmetrical Gyroscope," now Patent Number 2,731,836, issued January 24, 1956, and assigned to the same assignee as that of the present application, other and heretofore conventional structures may be employed instead.

In the front-end or indicating assembly, the angular orientations of the gyro main-gimbal 6 in relation to the outer frame 10 are translated into angular orientations of azimuth pointer 11 in relation to the azimuth indicia appearing on dial 12. Readings of pointer 11 against dial 12 are made through a window glass 13 supported in the front flange 14 which is part of the outer instrument casing 15.

Azimuth pointer 11 is angularly oriented in exact accordance with angular orientations of main gimbal 6 through action of the two synchros or angular motion repeaters 16 and 17. One of these synchros 16, comprises a rotor structure having an electrical winding 18 and core 19 which are fixed with the gyro main gimbal 6 through its lower journal 9. Single phase electrical excitation for winding 18 is brought (not visible in the drawing) through journal 9 from the main gimbal 6 where wires carrying this excitation are present for energizing the gyro motor. The stator of synchro 16 includes a core 20 and polyphase tapped output winding 21 which are affixed to the outer frame 10 and are influenced by the magnetic fluxes emitted by the synchro rotor structure. Signals characterizing the relative angular orientations of the synchro rotor and stator are thus produced at the electrically tapped points on stator winding 21. Repeater synchro 17 likewise includes a rotor structure having a core, 22, and a single phase winding, 23, the latter being excited through a slip-ring and brush assembly 24. Rotor shaft 25 supports these rotor structure elements and, further, angularly positions the azimuth pointer 11 which is attached to it at one end. The cooperating stator structure includes a core 26 and polyphase tapped winding 27 fixed in relation to a casing or housing 28 in which the rotor shaft 25 is also supported in low-friction bearings. For setting and adjustment purposes, the synchro 17 is supported in instrument frame 10 for controlled angular movement about the axis of its rotor shaft 25. Accordingly, the synchro casing 28 is rigidly affixed to a frame-mounted hub member 29 and is angularly movable with it in the manner described later herein. Index dial 12 is likewise angularly adjustable about the same axis, together with its supporting hub 30. As is shown in the drawing, synchro hub 29 is concentrically nested within the dial hub 30, and the latter is in turn positioned within a circular opening in instrument frame 10, the hubs 29 and 30 each being angularly movable in relation to one another and in relation to frame 10. Such angular motion is restrained by leaf springs; thus, springs 31 resiliently restrain relative angular motion between dial hub 30 and frame 10, and springs 32 restrain relative angular motion between synchro hub 29 and the dial hub 30. Controlled angular adjustments of dial 12 are realized through turning of the gear 33, which is attached to dial hub 30, by the gear 34 fixed to a manually-operated knob 35. Similarly, synchro hub 29 is adjusted by manipulations of knob 36 which turn the attached gear 37 and rotate the meshed gear 38 fixed to hub 29. The view in Figure 2, which is taken from the under side of the instrument front end, aids in understanding these relationships.

Because angular movements of synchro hub 29 and casing 28 through more than a full 360 degrees are desired for setting and adjustment purposes, the single phase electrical excitation of rotor winding 23 and polyphase excitation of stator winding 27 are brought through insulated slip rings 39, mounted on synchro hub 29, and insulated brushes 40 positioned on a frame bracket 41. Cable 42 brings electrical power to the synchro rotor, and cable 43 carries polyphase electrical signals from the stator winding 21 of transmitter synchro 16 to the stator winding 27 of synchro 17.

Neglecting the setting and adjusting mechanisms for the moment, it should be perceived that transmitter synchro 16 detects azimuth orientations of the gyro main gimbal 6 and causes receiver synchro 17 to position pointer 11 such that its angular orientations characterize the azimuth heading of a supporting aircraft, for example. The axis of azimuth pointer 11 is shown to be normal to the vertical major axis 7—7 of the gyroscope, which is a preferred relationship for dial and pointer presentations in an integral direct-indicating directional gyroscope instrument. Gyroscope operation is "free," that is, it is not caged periodically, it may assume any azimuth orientation, and it may drift slightly in azimuth due to unavoidable friction or unbalance effects. Such compensations in the output of azimuth indications as may be required from time to time are made by setting the azimuth pointer 11, leaving the gyroscope mechanism itself undisturbed, and the same is true in connection with the initial setting of pointer 11 to a desired azimuth heading or course. Pointer setting is not achieved by rotating the pointer 11 alone, however, but by rotating the entire repeater synchro 17. Thus, knob 36 is pressed inwardly and turned, rotating gears 37 and 38, and angularly moving the repeater synchro hub 29 and casing 28 against the restraint of leaf springs 32. Frictional restraint, by leaf springs 31, between gears 33 and 34, and between hub 30 and frame 10, prevents dial 12 from moving angularly when only knob 36 is turned. During such setting, the synchro rotor and azimuth pointer 11 are electromagnetically preserved in a relative angular position corresponding to that of the synchro rotor and stator of transmitter synchro 16, such that heading information continues to be repeated even though azimuth orientations of the supporting craft may be changing. Slip rings 39 and brushes 40 couple the two synchros together continuously during such setting and, while the frictions and torques introduced by these coupling elements may be made high to insure proper electrical interconnections, these frictions and torques are in no way reflected upon the gyroscope. Rather, they are wholly overcome by the operator in turning knob 36 and are of no adverse influence upon instrument accuracy. Further, the precessing torques usually associated with setting mechanisms of the heretofore known type, when mechanical coupling and decoupling of gyro and pointer are involved, are obviously avoided through practice of our invention because such coupling and decoupling do not occur.

When it is desired to adjust both the index dial 12 and azimuth pointer 11 to some preferred viewing or course position, as, for example, a vertical "on course" position, knob 35 is rotated. In turn, gears 34 and 33 are rotated, thereby occasioning angular movement of dial hub 30 and dial 12. Simultaneously, synchro hub 29 is rotated, by virtue of its firm frictional coupling with dial hub 29 through leaf springs 32. At such times, knob 36 is preferably moved axially outward to a forward position, at which its attached gear 37 does not engage synchro hub gear 38, as is shown by dashed lines 44 in Figure 2, and there is then minimized restraint upon the angular movement of synchro hub 29 with dial 12. Setting of both the azimuth pointer and dial is thus achieved with ease and accuracy, and the azimuth information provided by the pointer and index dial is uninterrupted throughout. Accordingly, the supporting craft may experience even the most severe changes or oscillations in azimuth headings during such setting operations without any of this informating being lost.

Precise corrections of the azimuth pointer indications, as for drift compensation, may likewise be made, irrespective of azimuth pointer oscillations or other movements. The amounts of such required corrections are known, and when the azimuth pointer knob, such as knob 36, is coupled with the synchro hub gear and turned by the required angular amounts, the azimuth pointer will be accurately corrected. For this purpose, the knob 36 has a small pointer 45 attached to it and this pointer cooperates with index or scale markings on the front surface 46 of boss 47. The gears 37 and 38 having an established ratio, the scale markings may be distributed to designate degrees or fractions of degrees of azimuth pointer movement for the angular movements of knob pointer 45 in relation to the scale on boss 46. Whenever correction is required, the azimuth knob need merely be pressed inward and turned in the direction and by the amount known to be necessary, without any reference to the azimuth pointer itself. Heretofore, azimuth pointer corrections have commonly been made with the pointer disconnected from or slipping in relation to the gyroscope, such that azimuthal movements of the supporting craft during the correcting process could introduce indication errors. In such instances, correction was made only when the azimuth pointer was stationary and could be read with accuracy.

In Figure 3 there is illustrated the front end mechanism of another gyro instrument employing the present teachings. The view taken is like that in Figure 2, and those elements corresponding to elements of the instrument of Figures 1 and 2 are identified by the same reference characters, having prime accents. The Figure 3 instrument is in most respects the same as that described hereinabove, with the principal exception that a differential gearing arrangement is embodied in the setting assembly in a manner which makes it unnecessary that either of the adjusting knobs be moved in axial directions to disengage gears. Thus, the azimuth pointer setting knob 36' need not be moved axially at any time, nor need the pointer and dial setting knob 35' be so moved.

When it is desired that the azimuth pointer 11' alone be adjusted, knob 36' is turned through an appropriate angle. This results in turning of the plate 52 which is rigidly attached to and turns with the knob shaft 49. This plate, 52, carries a pair of pinions, 52a and 53, one on each side thereof, which are fixed together on a common shaft freely rotatable on plate 52 at a fixed radius from the axis of the knob shaft 49. One of these pinions, 52a, is meshed with a further pinion 51 which is also rotatable on a shaft fixed to plate 52 at a fixed radial distance from the axis of shaft 49. The latter pinion, 51, engages one part, 50, of a double gear having another affixed part 48. Double gear parts 48 and 50 are rotatable in relation to the knob shaft 49 on which they are mounted, and gear part 48 is in a train with synchro hub gear 38' through a frame-mounted idler gear 48a. On the other side of plate 52 is a second double gear having a part 54 meshed with the plate-mounted pinion 53 and an attached gear part 55 meshed with the dial hub gear 33'. This second double gear is likewise concentric with and mounted upon knob shaft 49 for rotation in relation thereto. When knob 36' is turned, thus turning its attached plate 52, the pinion 53 is rotated in planetary fashion about double gear part 54, the latter remaining stationary because of frictional restraints reflected through the dial hub gear 33'. Turning of pinion 53 results in turning of pinions 52a and 51, and pinion 51 drives gear parts 50 and 48 as well as idler 48a and synchro hub gear 38'. As synchro hub gear 38' rotates, the azimuth pointer 11' follows its movements and is thus adjusted in the desired manner.

For setting of both the dial 12' and azimuth pointer 11' in unison, dial hub gear 33' and synchro hub gear 38' must be rotated in unison. This action is realized by turning of knob 35', such that its attached gear 34' turns dial hub gear 33'. At the same time, dial hub gear 33' turns the double gear elements 55 and 54, about knob shaft 49. Interconnected pinions 53 and 52a are turned by gear element 54 while plate 52 remains stationary with its attached knob shaft 49, and pinion 52a drives pinion 51 against the double gear element 50. Double gear element 50 rotates under influence of pinion 51, and turns the acting double gear element 48, idler 48a, and synchro hub gear 38' around at the same time. By proper selection of gear sizes, the synchro hub gear 38' and dial hub gear 33' are caused to rotate in unison, such that knob 35' causes dial 12' and azimuth pointer 11' to be set in exact synchronism.

Figure 4 illustrates a further embodiment of an integral directional gyroscope instrument having our improved setting and adjusting features, the view being taken from underneath the instrument. In the interest of avoiding repetition in descriptions of the basic assembly, which is similar to that of the instrument of Figures 1 and 2, the same reference characters, having double prime accents, are used to identify corresponding elements in the apparatus of Figure 4. The transmitter synchro 16", which electrically characterizes relative angular orientations of the gyro main gimbal 6" and the outer frame 10" about the vertical major axis 7", has its rotor structure fixed with the main gimbal journal 9", as is shown in the detailed fragmentary side view in Figure 5, and has its stator structure mounted on main frame 10" for angular movement in relation thereto about major axis 7"—7". The stator structure of synchro 16" is fixed with a ring gear 56 which is turned by a worm gear 57 supported by frame 10" and actuated by the pointer-adjusting knob 58. Annular support ring 59, shown in Figure 5, is rotatable in frame 10' to permit angular adjustment of the synchro stator mounted with it. Insulated slip rings 60 cooperate with frame-mounted insulated brushes 61 to couple excitation from the polyphase tapped synchro stator winding 21" to the stator winding of the synchro 17". With the stator of repeater synchro 17" held fixed in angular orientation, manipulation of knob 58 will result in angular adjustment of the stator of transmitter synchro 16" and angular adjustment of the azimuth pointer 11" as its attached synchro rotor follows the adjustments. The gyroscope is completely "free" during such adjustment, and azimuth information is not lost. Knob 58 preferably has a small pointer 62 attached to it for reading against a suitably marked scale on the front surface 63 of the instrument boss 64, such that accurate azimuth corrections may be introduced at any time in a manner already described. Whatever frictions and torques appear between the stator of synchro 16" and frame 10", and between slip rings 60 and brushes 61, are of no influence upon gyroscope accuracies and are overcome by the operator.

Knob 65 is effective to set both azimuth pointer 11" and dial 12" synchronously. Gear 66 fixed with knob 65 turns the dial hub gear 33" to accomplish both dial setting and azimuth pointer setting at the same time. This result obtains because, in this construction, the hub 29" of repeater synchro 17" is rigidly secured to dial hub 30", as by the illustrated screws 67. In this respect the repeater synchro arrangement differs from that earlier described, and of course, no separate synchro hub gear is required. As dial gear 33" rotates, the stator of synchro 17" does likewise, and the synchro rotor thereof follows the attendant stator angular movements to position the azimuth pointer 11". Neither knob need be moved axially to permit the separate adjustments by the other to take place.

It should be apparent that various features described in connection with the specific instruments illustrated may be modified or combined in other relationships in practice of our invention. Gearing arrangements may be altered or replaced with friction clutches in some instances. It is intended also that electrical transmitter and receiver devices other than the particular synchros shown may by utilized. Thus, while certain embodiments have been illustrated and described herein, it will occur to those skilled in the art that changes and modifications can be accomplished without departing either in spirit or scope from the invention as set forth in the appended claims.

What we claim as new and desire to secure by Letters Patent of the United States is:

1. An adjustable gyroscope arrangement comprising a gyro rotor structure, a main gimbal pivotally supporting said rotor structure about a minor axis, an instrument frame supporting said main gimbal for angular movement about a major axis normal to said minor axis, an electrical transmitter unit having a rotor structure angularly positioned by said main gimbal and a stator structure mounted on said frame and producing an output of electrical signals characterizing relative angular orientations of said gimbal and frame, an electrical repeater unit having cooperating rotor and stator structures, an indicator member coupled with the rotor structure of said repeater unit for angular movement thereby, means mounting the stator structure of said repeater unit on said frame, means electrically interconnecting said stator structures of said transmitter and repeater units such that the relative angular orientations of the stator and rotor structures in said transmitter unit are repeated in said repeater unit, and means for angularly adjusting the stator structure of one of said units in relation to said frame to occasion angular adjustment of said indicator member, said electrically interconnecting means including a rotatable electrical coupling between said one stator structure and said frame whereby said units remain electrically interconnected during operation of said angular adjusting means.

2. An adjustable gyroscope arrangement comprising a gyro rotor structure, a main gimbal pivotally supporting said rotor structure about a minor axis, an instrument frame supporting said main gimbal for angular movement about a major axis normal to said minor axis, an electrical transmitter unit having a rotor structure angularly positioned by said main gimbal and a stator structure mounted on said frame and producing an output of electrical signals characterizing relative angular orientations of said gimbal and frame about said major axis, an electrical repeater unit having cooperating rotor and stator structures, an indicator member coupled with the rotor structure of said repeater unit for angular movement thereby, means mounting the stator structure of said repeater unit on said frame for adjustable angular movement about the axis of rotation of said repeater unit rotor structure, means electrically interconnecting said stator structures of said transmitter and repeater units such that the relative angular orientations of the stator and rotor structures in said transmitter unit are repeated in said repeater unit, said electrically interconnecting means including a rotatable electrical coupling between said frame and the stator structure of said repeater unit whereby said units remain electrically interconnected when said repeater unit stator structure is angularly adjusted, and manually operated means for angularly adjusting said repeater unit stator structure about said axis of said repeater unit rotor structure.

3. An adjustable gyroscope arrangement comprising: a gyro rotor structure; a main gimbal pivotally supporting said rotor structure about a minor axis; an instrument frame supporting said main gimbal for angular movement about a major axis normal to said minor axis; an electrical transmitter unit having an electrically excited wound rotor structure angularly positioned by said main gimbal and a polyphase-tapped wound stator structure mounted on said frame and producing an output of electrical signals characterizing relative angular orientations of said gimbal and frame about said major axis; and electrical repeater unit comprising a pair of cooperating members, one of said members being a rotor structure and the other of said members being a cooperating polyphase-tapped wound stator structure; an indicator member coupled with the rotor structure of said repeater unit for angular movement thereby; means mounting said repeater unit stator structure on said frame for adjustable angular movement about the axis of rotation of said repeater unit rotor structure; a rotatable electrical coupling having slip rings fixed with one of said members and having cooperating brushes fixed with the other of said members, said slip rings and brushes being disposed for electrical contacting during relative angular movements thereof about said repeater unit rotor structure axis; electrical conductor means electrically coupling said polyphase-tapped stator structures through said rotatable electrical coupling; and manually operated means for angularly adjusting said repeater unit stator structure in said frame whereby to occasion angular adjustment of said indicator member.

4. An adjustable directional gyroscope arrangement comprising: a gyro rotor structure; a main gimbal pivotally supporting said rotor structure about a normally-horizontal minor axis; an instrument frame supporting said main gimbal for angular movement about a normally-vertical major axis; an electrical transmitter unit having an electrically-excited wound rotor structure angularly positioned by said main gimbal and a polyphase-tapped wound stator structure mounted on said frame and producing an output of electrical signals characterizing relative angular orientations of said gimbal and frame about said major axis; an electrical repeater unit comprising a pair of cooperating members, one of said members being a rotor structure rotatable about a normally horizontal indicator axis and the other of said members being a cooperating polyphase-tapped wound stator structure; an azimuth indicator fixed with said repeater unit rotor structure for angular movement therewith about said indicator axis; means mounting said repeater unit stator structure on said frame for adjustable angular movement about said indicator axis; a rotatable electrical coupling having slip rings fixed with one of said members and having cooperating brushes fixed with the other of said members, said slip rings and brushes being disposed for electrical contacting during relative angular movements thereof about said indicator axis; electrical conductor means electrically coupling said polyphase-tapped stator structures through said rotatable electrical coupling; and manually operated means for angularly adjusting said repeater unit stator structure in said frame about said indicator axis whereby to occasion angular adjustment of said azimuth indicator.

5. An adjustable gyroscope arrangement comprising a gyro rotor structure, a main gimbal pivotally supporting said rotor structure about a minor axis, an instrument frame supporting said main gimbal for angular movement about a major axis normal to said minor axis, an electrical transmitter unit coupled between said main gimbal and said frame and producing an output of electrical signals characterizing relative angular orientations of said gimbal and frame about said major axis, an electrical repeater unit having cooperating rotor and stator structures, a first indicator member coupled with the rotor structure of said repeater unit for angular movement thereby about an indicator axis, a second indicator member mounted on said frame for adjustable angular movement about said indicator axis, means mounting the stator structure of said repeater unit on said frame for adjustable angular movement in relation thereto, means applying said output of electrical signals to said stator structure such that relative angular orientations of said frame and gimbal are characterized by relative angular orientations of said repeater unit rotor and stator structures, said output applying means including a rotatable electrical coupling between said frame and said stator structure for applying said signals continuously during angular adjustment of said stator structure, means restraining angular movements of said repeater unit stator structure in relation to said second indicator, manually operated means for angularly adjusting said second indicator about said indicator axis whereby said stator structure and said first indicator are angularly adjusted in synchronism therewith, means restraining angular movements of said second indicator in relation to said frame, and manually operated means for angularly adjusting said repeater unit stator structure in relation to said frame.

6. An adjustable gyroscope arrangement comprising a gyro rotor structure, a main gimbal pivotally supporting said rotor structure about a minor axis, an instrument frame supporting said main gimbal for angular movement about a major axis normal to said minor axis, an electrical transmitter unit having a rotor structure angularly positioned by said main gimbal and a stator structure mounted on said frame and producing an output of electrical signals characterizing relative angular orientations of said gimbal and frame about said major axis, an electrical angular motion repeating unit having cooperating rotor and stator structures, a first indicator member coupled with the rotor structure of said repeater unit for angular movement thereby about an indicator axis, a second indicator member, means mounting said second indicator member and the stator structure of said repeater unit on said frame for adjustable angular movement about said indicator axis, means applying said output of electrical signals to said repeater unit stator structure such that relative angular orientations of said frame and gimbal are characterized by relative angular orientations of said repeater unit rotor and stator structures, said output applying means including a rotatable electrical coupling between said frame and said stator structure of said repeater unit for applying said signals continuously during angular adjustment of said stator structure of said repeater unit, first manually operated means for angularly adjusting said second indicator member and said repeater unit stator structure in synchronism about said indicator axis, whereby to set said first and second indicator members synchronously, and second manually operated means for angularly adjusting one of said stator structures of said electrical units independently of said second indicator member, whereby to angularly adjust said first indicator member about said indicator axis.

7. An adjustable gyroscope arrangement as set forth in claim 6 further comprising means fastening said second indicator member in a fixed angular relationship to said repeater unit stator structure, and wherein said second manually operated means is disposed for angular adjustment of the stator structure of said transmitter unit about said major axis, and wherein said output applying means further includes a rotatable electrical coupling between said frame and said transmitter unit stator structure for applying said signals continuously during angular adjustment of said transmitter unit stator structure.

8. An adjustable gyroscope arrangement as set forth in claim 6 wherein said means mounting said second indicator member and said repeater unit stator structure on said frame permits relative angular movement between said second indicator member and said repeater unit stator structure, wherein said second manually operated means angularly adjusts said repeater unit stator structure, and wherein said first manually operated means angularly moves said second indicator member directly, and further comprising angular restraining means between said frame and second indicator member and between said second indicator member and said repeater unit stator structure whereby angular adjustment of said repeater unit stator structure is independent of said second indicator member and whereby angular adjustment of said second indicator member effects synchronous angular adjustment of said repeater unit stator structure and said first indicator.

9. An adjustable directional gyroscope arrangement comprising a directional gyroscope mechanism having a main gimbal pivotally mounted in an instrument frame about a normally-vertical major suspension axis, an electrical transmitter unit coupled between said gimbal and frame and producing an output of electrical signals characterizing relative angular orientations of said gimbal and frame about said major axis, an electrical angular motion repeater unit having a stator structure and a concentric rotor structure, an azimuth indicator fixed with said rotor structure for rotation therewith about a normally horizontal indicator axis, an azimuth index member mounted on said frame for angular adjustment about said indicator axis, means mounting said stator structure on said frame for angular adjustment about said indicator axis, means mounting said rotor structure for angular rotation in relation to said stator structure about said indicator axis, a rotatable electrical coupling between said stator structure and frame about said indicator axis applying said output signals to said stator structure, first manually actuated means for angularly adjusting the angular orientation of the electromagnetic field of said stator structure in relation to said frame about said indicator axis, and second manually actuated means for angularly adjusting said electromagnetic field and said index member in synchronism about said indicator axis.

10. An adjustable directional gyroscope arrangement as set forth in claim 9 further comprising a first gear fixed with said repeater unit stator structure about said indicator axis, a second gear fixed with said index member about said indicator axis, a differential gearing arrangement coupled between said first and second gears and with said first and second manually actuated means such that said first manually actuated means rotates said first gear through said differential gearing arrangement independently of said second gear and such that said second manually actuated means rotates said first and second gears in synchronism through said differential gearing arrangement.

11. An adjustable directional gyroscope arrangement as set forth in claim 9 further comprising first frictional restraint means restraining angular movement of said index member in relation to said frame, and second frictional restraint means restraining angular movement of said stator structure in relation to said index member, and wherein said first manually actuated means is connected to drive said stator structure angularly about said indicator axis, and wherein said second manually actuated means is connected to drive said index member angularly about said indicator axis.

12. An adjustable directional gyroscope arrangement as set forth in claim 9 further comprising a rotatable electrical coupling between said electrical transmitter and said frame about said major suspension axis applying said output signals to said stator structure, and wherein said means mounting said stator structure includes means angularly fastening said stator structure with said index member, wherein said first manually actuated means adjusts the angular orientations of said transmitter unit in relation to said gimbal and frame about said major axis, and wherein said second manually actuated means angularly adjusts said index member and stator structure about said indicator axis.

References Cited in the file of this patent

UNITED STATES PATENTS

| | | |
|---|---|---|
| 1,092,816 | Anschutz-Kaempfe | Apr. 14, 1914 |
| 1,296,440 | Sperry | Mar. 4, 1919 |
| 2,433,837 | Dawson | Jan. 6, 1948 |
| 2,704,457 | Gabrielson et al. | Mar. 22, 1955 |

UNITED STATES PATENT OFFICE

CERTIFICATE OF CORRECTION

Patent No. 2,814,955                                  December 3, 1957

Ernest C. Wegman et al.

It is hereby certified that error appears in the printed specification of the above numbered patent requiring correction and that the said Letters Patent should read as corrected below.

Column 2, line 57, for "although" read -- through --; column 6, line 60, for "frame 10'" read -- frame 10" --.

Signed and sealed this 4th day of February 1958.

(SEAL)
Attest:
KARL H. AXLINE
Attesting Officer

ROBERT C. WATSON
Commissioner of Patents